US009572188B2

(12) United States Patent
Ren et al.

(10) Patent No.: US 9,572,188 B2
(45) Date of Patent: Feb. 14, 2017

(54) COMMUNICATION DEVICE

(71) Applicant: Brother Kogyo Kabushiki Kaisha, Nagoya-shi, Aichi-ken (JP)

(72) Inventors: Yongyong Ren, Nagoya (JP); Kunihito Terashita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 24 days.

(21) Appl. No.: 14/746,904

(22) Filed: Jun. 23, 2015

(65) Prior Publication Data

US 2015/0373763 A1 Dec. 24, 2015

(30) Foreign Application Priority Data

Jun. 24, 2014 (JP) .................................. 2014-129234

(51) Int. Cl.
| | | |
|---|---|---|
| *H04W 84/20* | (2009.01) | |
| *H04W 84/18* | (2009.01) | |
| *H04W 76/00* | (2009.01) | |
| *H04W 48/16* | (2009.01) | |
| *H04W 76/02* | (2009.01) | |
| H04W 8/00 | (2009.01) | |
| H04W 8/22 | (2009.01) | |

(52) U.S. Cl.
CPC .......... *H04W 76/023* (2013.01); *H04W 8/005* (2013.01); *H04W 8/22* (2013.01); *H04W 84/18* (2013.01)

(58) Field of Classification Search
CPC ...... H04W 84/12; H04W 48/16; H04W 84/18; H04W 84/20; H04W 8/005; H04W 8/22; H04W 76/02; H04W 76/021; H04W 76/023; H04W 88/06
See application file for complete search history.

(56) References Cited

U.S. PATENT DOCUMENTS

| | | | | |
|---|---|---|---|---|
| 9,055,611 | B2* | 6/2015 | Baker | H04W 84/12 |
| 9,100,774 | B2* | 8/2015 | Suzuki | H04W 4/008 |
| 9,137,306 | B2* | 9/2015 | Jung | H04W 12/06 |
| 9,223,522 | B2* | 12/2015 | Nagasaki | H04W 8/005 |
| 9,282,440 | B2* | 3/2016 | Saito | H04W 4/08 |

(Continued)

FOREIGN PATENT DOCUMENTS

| | | |
|---|---|---|
| JP | 2012-129898 A | 7/2012 |
| JP | 2012-186555 A | 9/2012 |
| JP | 2012-186643 A | 9/2012 |

OTHER PUBLICATIONS

Wi-Fi Alliance Technical Committee P2P Task Group, "Wi-Fi Peer-to Peer (P2P) Technical Specification", Version 1.1, pp. 1-159.

*Primary Examiner* — Ahmed Elallam
(74) *Attorney, Agent, or Firm* — Banner & Witcoff, Ltd.

(57) ABSTRACT

A communication device may accept an instruction for establishing a wireless network to which the communication device and an external device are to belong, search for the external device in a case where the instruction is accepted, to transfer from a parent state to a non-parent state in a case where the communication device is in the parent state and the searched external device is in the parent state, and execute a forming process for forming a first wireless network to which the communication device is to belong as a child station and the external device is to belong as the parent station after the state of the communication device had transferred to the non-parent state.

10 Claims, 4 Drawing Sheets

(56) References Cited

U.S. PATENT DOCUMENTS

| | | | |
|---|---|---|---|
| 9,288,838 B2* | 3/2016 | Shimada | H04W 76/023 |
| 9,307,574 B2* | 4/2016 | Nogawa | H04W 8/005 |
| 9,414,435 B2* | 8/2016 | Suzuki | H04W 88/06 |
| 2012/0224569 A1 | 9/2012 | Kubota | |
| 2012/0233266 A1* | 9/2012 | Hassan | H04W 4/08 |
| | | | 709/206 |
| 2013/0100855 A1* | 4/2013 | Jung | H04W 12/06 |
| | | | 370/254 |
| 2013/0260683 A1 | 10/2013 | Suzuki et al. | |
| 2014/0181201 A1* | 6/2014 | Choi | H04W 8/186 |
| | | | 709/204 |
| 2014/0280661 A1* | 9/2014 | Nogawa | H04W 84/12 |
| | | | 709/208 |

* cited by examiner

FIG. 1
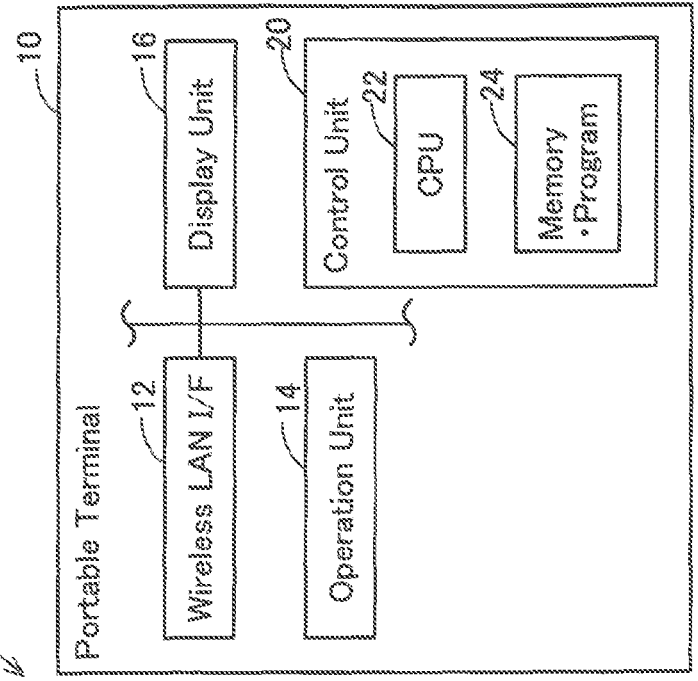
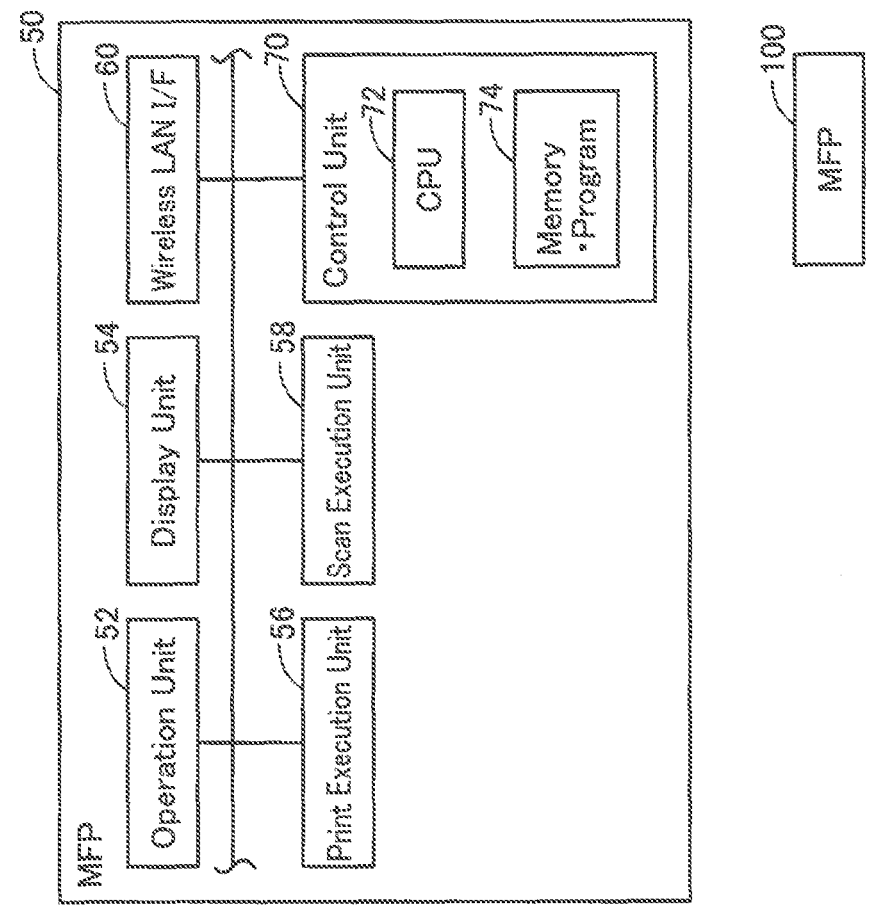

(Case B : Case that Portable Terminal and MFP both Transfer to Device State)

COMMUNICATION DEVICE

CROSS-REFERENCE TO RELATED APPLICATION

This application claims priority to Japanese Patent Application No. 2014-129234, filed on Jun. 24, 2014, the contents of which are hereby incorporated by reference into the present application.

TECHNICAL FIELD

The present description discloses a communication device for belonging to a wireless network.

DESCRIPTION OF RELATED ART

Wireless communication technology that complies with a Wi-Fi Direct (registered trade mark) (hereinafter called "WFD") scheme is known.

SUMMARY

In a wireless network formed in compliance with WFD, a wireless network to which one communication device belongs as a group owner and another communication device belongs as a client is formed. However, when forming a wireless network in compliance with WFD, there are cases where a wireless network to which the respective communication devices belong cannot be formed, depending on the states of the communication devices that are to form the network (for example, a state in which a communication device should belong as a group owner).

The present application provides a technique by which a communication device may appropriately form a wireless network with an external device.

The present description discloses a communication device that may comprise a processor, and a memory storing computer-readable instructions therein. The computer-readable instructions, when executed by the processor, may cause the communication device to execute: accepting an instruction for establishing a wireless network to which the communication device and an external device are to belong, each of the communication device and the external device being capable of transferring to one of a parent state of belonging to the wireless network as a parent station and a non-parent state being different from the parent state; searching for the external device in a case where the instruction is accepted; causing a state of the communication device to transfer from the parent state to the non-parent state in a case where the communication device is in the parent state and the searched external device is in the parent state; and executing a forming process for forming a first wireless network to which the communication device is to belong as a child station and the external device is to belong as the parent station after the state of the communication device had transferred to the non-parent state.

A control method, a computer program, and a computer-readable recording medium that stores the computer program for realizing the aforementioned communication device are also novel and useful. A communication system provided with the aforementioned communication device and the external device is also novel and useful.

BRIEF DESCRIPTION OF DRAWINGS

FIG. 1 shows the configuration of a communication system.

EMBODIMENT (Configuration of Communication System 2; FIG. 1)

As shown in FIG. 1, a communication system 2 comprises a portable terminal 10 and multifunction apparatuses 50 and 100 (referred to as "MFP" in the drawings). Each of the portable terminal 10 and the multifunction apparatuses 50 and 100 are capable of executing a wireless communication based on a Wi-Fi scheme (that is, a Wi-Fi communication). The Wi-Fi scheme is a communication scheme devised by the Wi-Fi Alliance.

(Configuration of Portable Terminal 10)

Figure 2:
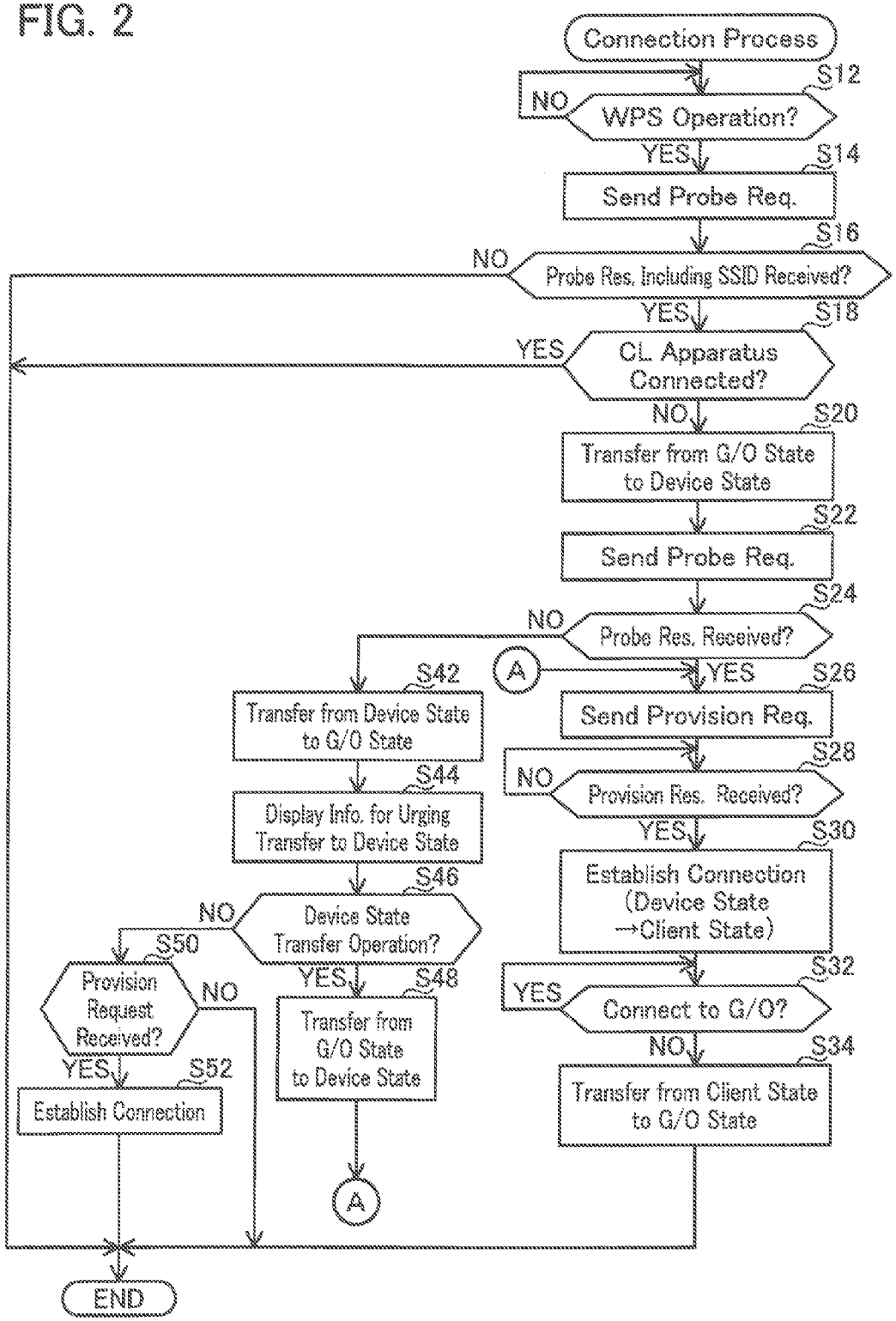
FIG. 2 shows a flowchart of a connection process executed by a portable terminal.

The portable terminal 10, for example, is a portable terminal device, such as a mobile phone (e.g.: a smartphone), a PDA, a notebook PC, a tablet PC, a mobile music reproduction device, or a mobile video reproduction device. The portable terminal 10 includes a wireless local area network (LAN) interface 12, an operation unit 14, a display unit 16, and a control unit 20. Interface is abbreviated as "I/F" hereinbelow and in the drawings.

The operation unit 14 includes a plurality of keys. A user can input various instructions to the portable terminal 10 by operating the operation unit 14. The display unit 16 is a display for displaying various types of information.

The wireless LAN I/F 12 is for executing a Wi-Fi communication. The Wi-Fi scheme, for example, is a wireless communication scheme that complies with IEEE (abbreviation for The Institute of Electrical and Electronics Engineers, Inc.) standard 802.11, or standards conforming thereto (e.g.: 802.11a, 11b, 11g, 11n, and so forth).

Stated more specifically, the wireless LAN I/F 12 supports the WFD scheme devised by the Wi-Fi Alliance. Therefore, the control unit 20 can execute a Wi-Fi communication via the wireless LAN I/F 12 using a wireless network based on a WFD scheme (hereinafter called "WFDNW"). The WFD scheme is described in detail in "Wi-Fi Peer-to-Peer (P2P) Technical Specification Version 1.1" prepared by the Wi-Fi Alliance. The WFD scheme is also disclosed in detail in US Patent Application Publication No. 2013/0260683, contents of which are incorporated herein by reference.

In the aforementioned WFD specification, three states are defined as the states of apparatuses capable of executing a Wi-Fi communication using a WFD wireless network (hereinafter called "WFD-enabled apparatus"), i.e., a Group Owner (hereinafter called "G/O") state, a client state, and a device state. A WFD-enabled apparatus can be selectively operated in one of the three states mentioned above. In a WFDNW, the operation of one apparatus in the G/O state causes this one apparatus to belong to the WFDNW as the G/O. When a plurality of apparatuses belongs to the WFDNW, the apparatus other than the G/O is operated in the client state, and belongs to the WFDNW as a client. When an apparatus that belongs to the WFDNW as a client (hereinafter called "CL apparatus") exists, the apparatus belonging to the WFDNW in the G/O state stores a management list in which CL apparatus identification information (e.g.: MAC address) is registered for managing the CL apparatus.

The control unit 20 includes a CPU 22 and a memory 24. The CPU 22 is a processor that executes various processes in accordance with programs stored in the memory 24. The memory 24 is configured using ROM, RAM, and a hard disk. The memory 24 stores a basic program, a connection process program, and the like. The basic program is for the CPU 22 to execute basic functions of the portable terminal 10 (e.g.: email communication function, display function, and so forth). The connection process program is for executing the connection process of FIG. 2, which will be described below. The memory 24 also stores a forced G/O (abbreviation of Group Owner) mode flag in addition to the aforementioned programs.

The forced G/O mode flag denotes either "0" or "1". When a forced G/O mode flag of "1" is stored in the memory 24, the portable terminal 10 is set to a forced G/O mode, and when a forced G/O mode flag of "0" is stored in the memory 24, the portable terminal 10 is not set to the forced G/O mode. When the forced G/O mode is set, the CPU 22 forms a WFDNW by transferring the portable terminal 10 to G/O state of the WFD scheme regardless of whether or not a client-state apparatus is wirelessly connected to the portable terminal 10. In this case, the CPU 22 prepares a wireless profile to be used by the WFDNW and causes this wireless profile to be stored in the memory 24.

The wireless profile is wireless setting information to be used by the WFDNW, and includes an SSID, an authentication scheme, an encryption scheme, and a password. The SSID is an identifier for identifying the WFDNW. The authentication scheme, the encryption scheme, and the password are information to be used in an authentication and an encryption to be executed by the WFDNW. In a case where the portable terminal 10 is set to the forced G/O mode, the CPU 22 transfers the portable terminal 10 to G/O state of the WFD scheme when the power is turned ON, and forms a WFDNW. At this time, the CPU 22 prepares the wireless setting information to be used by the WFDNW, and causes this information to be stored in the memory 24. When a CL apparatus exists in the WFDNW, the memory 24 also stores a management list in which the MAC address of the CL apparatus is recorded.

The user can select a forced G/O mode flag of either "0" or "1" by operating the operation unit 14.

The portable terminal 10 supports a wireless connection method of a WPS (abbreviation for Wi-Fi Protected Setup) push-button configuration (hereinafter called "PBC method"). The PBC method of the WPS is for sending a wireless profile from one apparatus to another apparatus (that is, executing a WPS communication) and establishing a communication connection between the pair of apparatuses when a predetermined operation (hereinafter called "WPS operation") is executed by each of the pair of apparatuses, even though a PIN code display and input have not been performed in each of the pair of apparatuses. Furthermore, in a modification, the portable terminal 10 may support AOSS (registered trademark), AOSS2, SES (abbreviation for Secure Easy Setup; registered trademark), and so forth instead of the PBC method of the WPS. All of these are the same method as the PBC method of the WPS. Furthermore, the portable terminal 10 may support a PIN code method of the WPS. The PIN code method of WPS is for sending the wireless setting information from the one (or the other) apparatus to the other (or the one) apparatus (that is, executing a WPS communication) and establishing a communication connection between the pair of apparatuses in a case where a PIN code is displayed on the one apparatus and the aforementioned PIN code is inputted to the other apparatus.

(Configuration of Multifunction Apparatus 50)

The multifunction apparatus 50 is a peripheral apparatus (that is, a portable terminal 10 peripheral apparatus) that is capable of executing multiple functions, including a print function and a scan function. The multifunction apparatus 50 includes an operation unit 52, a display unit 54, a print execution unit 56, a scan execution unit 58, a wireless LAN I/F 60, and a control unit 70.

The operation unit 52 is provided with a plurality of keys. The user can input various instructions to the multifunction apparatus 50 by operating the operation unit 52. The display unit 54 is a display for displaying various types of information. The print execution unit 56 is an inkjet system, laser system, or other such print mechanism. The scan execution unit 58 is a CCD, CIS, or other such scan mechanism.

The wireless LAN I/F 60 is the same as the wireless LAN I/F 12 of the portable terminal 10. The control unit 70 includes a CPU 72 and a memory 74. The CPU 72 is a processor that executes various processes (e.g.: a print process and a scan process) in accordance with a basic program stored in the memory 74. The memory 74 is configured using ROM, RAM, and a hard disk. The memory 74 also stores a connection process program and a wireless profile in addition to the aforementioned basic program. The connection process program is for executing the connection process of FIG. 2, which will be described below. In addition to the aforementioned programs, the memory 74 also stores the same forced G/O mode flag as that of the portable terminal 10. At time of shipment, a forced G/O mode flag of "1" is stored in the memory 74, and the user can select a forced G/O mode flag of either one of "0" or "1" by operating the operation unit 52. The multifunction apparatus 50 supports the PBC method of the WPS in the same manner as the portable terminal 10.

(Configuration of Multifunction Apparatus 100)

The multifunction apparatus 100 has the same configuration as the multifunction apparatus 50. However, the connection process program is not stored in the memory of the multifunction apparatus 100.

(Connection Process; FIG. 2)

Next, the contents of a connection process executed by the CPU 22 of the portable terminal 10 will be explained by referring to FIG. 2. The start of a connection process is triggered by either the power to the portable terminal 10 being turned ON and the forced G/O mode flag being "1", or the forced G/O mode flag being changed from "0" to "1". Furthermore, the CPU 72 of the multifunction apparatus 50 executes the connection process of FIG. 2 in accordance with the connection process program in the same manner as the CPU 22 of the portable terminal 10, but the CPU of the multifunction apparatus 100 does not execute the connection process.

In S12, the CPU 22 monitors for a WPS operation being executed on the operation unit 12 of the portable terminal 10. When a WPS operation is executed (S12: YES), in S14, the CPU 22 executes a process for detecting an apparatus that exists in the vicinity of the execution apparatus (e.g.: multifunction apparatus 50) by sending a Probe Request signal and receiving a Probe Response signal. When a Probe Request signal is received from another apparatus (e.g.: multifunction apparatus 50) at the timing when S12 is executed, the CPU 22 executes a process for notifying the other apparatus of the existence of the portable terminal 10 by sending a Probe Response signal in parallel to S12.

In S16, the CPU 22 monitors for a Probe Response signal including an SSID being received as a response to the Probe Request signal sent in S14. When either a Probe Response signal has not been received even though a prescribed time period has elapsed since sending the Probe Request signal, or a Probe Response signal that does not include an SSID is received (S16: NO), the CPU 22 ends the connection process. When the Probe Response signal is not received, the portable terminal 10 is unable to connect to the other apparatus via the WFDNW. Alternatively, when the Probe Response signal that does not include an SSID is received, the sender apparatus of the Probe Response signal is in the device state. Therefore, a process (e.g.: the communication of an Authentication Request signal, an Authentication Response signal, a 4-Way Handshake signal, or the like) is executed between the portable terminal 10 and the sender apparatus of the Probe Response signal for the sender apparatus of the Probe Response signal to belong to the WFDNW, as a client, to which the portable terminal 10 belongs as the G/O. Consequently, a connection is established between the portable terminal 10 and the sender apparatus of the Probe Response signal as a result of the portable terminal 10 and the sender apparatus of the Probe Response signal belonging to the same WDFNW.

Alternatively, when the Probe Response signal that includes an SSID is received prior to the prescribed time period elapsing after sending the Probe Request signal (S16: YES), processing proceeds to S18. A case where a Probe Response signal that includes an SSID is received is a case in which the sender apparatus of the Probe Response signal (hereinafter call "target apparatus") is in the G/O state. In this case, both the portable terminal 10 and the target apparatus are in the G/O state, and it is not possible to establish a WFDNW to which both the portable terminal 10 and the target apparatus belong while maintaining their aforementioned state.

In a case where S16 is YES, in S18, the CPU 22 determines whether or not there exists an apparatus that is connected to the portable terminal 10 (that is, a CL apparatus belonging to the WFDNW to which the portable terminal 10 belongs as the G/O). When one or more MAC addresses are recorded in the management list stored in the memory 24, the CPU 22 determines that a CL apparatus that is connected to the portable terminal 10 exists (S18: YES), and ends the connection process. Alternatively, when not even one MAC address is recorded in the management list stored in the memory 24, the CPU 22 determines that there is no CL apparatus connected to the portable terminal 10 (S18: NO), and proceeds to S20.

In S20, the CPU 22 deletes the management list stored in the memory 24, and causes the portable terminal 10 to transfer from the G/O state to the device state. Next, in S22, the CPU 22 broadcasts a Probe Request signal that includes the SSID included in the Probe Response signal received in S16. Next, in S24, the CPU 22 monitors for receipt of a Probe Response signal as a response to the Probe Request signal sent in S22.

The apparatus that received the Probe Request signal sent in S22, in a case where the SSID included in the Probe Request signal matches the SSID of the wireless profile stored in the apparatus, sends a Probe Response signal including the SSID stored in the apparatus. Alternatively, in a case where the SSID included in the Probe Request signal does not match the SSID of the wireless profile stored in the apparatus, or a case where a wireless profile is not stored in the apparatus, the apparatus that received the Probe Request signal sent in S22 does not send a Probe Response signal. That is, in a case where the Probe Response signal is received in the portable terminal 10 in S24, the target apparatus is maintained in the G/O state.

When the Probe Response signal is received in S24 (S24: YES), in S26, the CPU 22 sends a Provision Discovery Request signal (hereinafter called "Provision Request signal") to the target device. Then, in S28, the CPU 22 waits to receive a Provision Discovery Response signal (hereinafter called "Provision Response signal") as a response to the Provision Request signal from the target apparatus. When the Provision Response signal is received (S28: YES), in S30, the CPU 22 executes a connection establishing process for connecting the portable terminal 10 to the target apparatus. In the connection establishing process, the CPU 22 acquires from the target apparatus the wireless profile of the WFDNW to which the target apparatus belongs as the G/O. The CPU 22 stores the acquired wireless profile in the memory 24, and transfers the portable terminal 10 from the device state to the client state.

In S32, the CPU 22 regularly checks whether the portable terminal 10 is connected to the G/O state apparatus (that is, the target apparatus) while the portable terminal 10 is belonging to the WFDNW. For example, the CPU 22 sends to the target apparatus a prescribed packet by using the WFDNW, and checks for receipt of a response packet in response to the prescribed packet. When the response packet is received prior to the passage of a prescribed time period after sending the prescribed packet, the CPU 22 determines that the portable terminal 10 is connected to the target apparatus (S32: YES). Alternatively, when the response packet has not been received even though the prescribed time period has elapsed after sending the prescribed packet, the CPU 22 determines that the portable terminal 10 is not connected to the target apparatus (S32: NO), and proceeds to S34. In S34, the CPU 22 transfers the portable terminal 10 from the client state to the G/O state, and ends the connection process.

In S24, when the Probe Response signal has not been received even though the prescribed time period has elapsed after sending the Probe Request signal (S24: NO), in S42, the CPU 22 transfers the portable terminal 10 from the device state to the G/O state. When the Probe Response signal is not received (S24: NO), it is highly likely that the target apparatus is an apparatus having a connection process program, that is, is executing the processes of S18 and S20 in the same manner as the portable terminal 10. In other words, it is highly likely that the target apparatus has been transferred to the device state. Accordingly, in S44, the CPU 22 causes a display urging the user to transfer either one of the portable terminal 10 or the target apparatus from the G/O state to the device state to be displayed on the display unit 14.

Next, in S46, the CPU 22 monitors for a prescribed device state transfer operation to be executed on the operation unit 12 by the user until a prescribed time period has elapsed from the display of S44. When the device state transfer operation is executed (S46: YES), in S48, the CPU 22 deletes the wireless profile stored in the memory 24, transfers the portable terminal 10 from the G/O state to the device state, and proceeds to S26.

Alternatively, when a device state transfer operation has not been executed even though the prescribed time period has elapsed from the display of S44 (S46: NO), in S50, the CPU 22 monitors whether or not a Provision Request signal is received from the target apparatus. In the case of NO in S46, it is highly likely that the target apparatus has been transferred from the G/O state to the device state. In this case, the Provision Request signal is received from the target apparatus. When the Provision Request signal is not received from the target apparatus (S50: NO), the CPU 22 ends the connection process. Alternatively, when the Provision Request signal is received from the target apparatus (S50: YES), in S52, the CPU 22 executes a connection establishing process. In the connection establishing process, the CPU 22 sends the wireless profile stored in the memory 24 to the target apparatus. Consequently, a WFDNW to which the portable terminal 10 belongs as the G/O and the target apparatus belongs as the client is established and the CPU 22 ends the connection process.

(Effects of the Present Embodiment)

Figure 3:
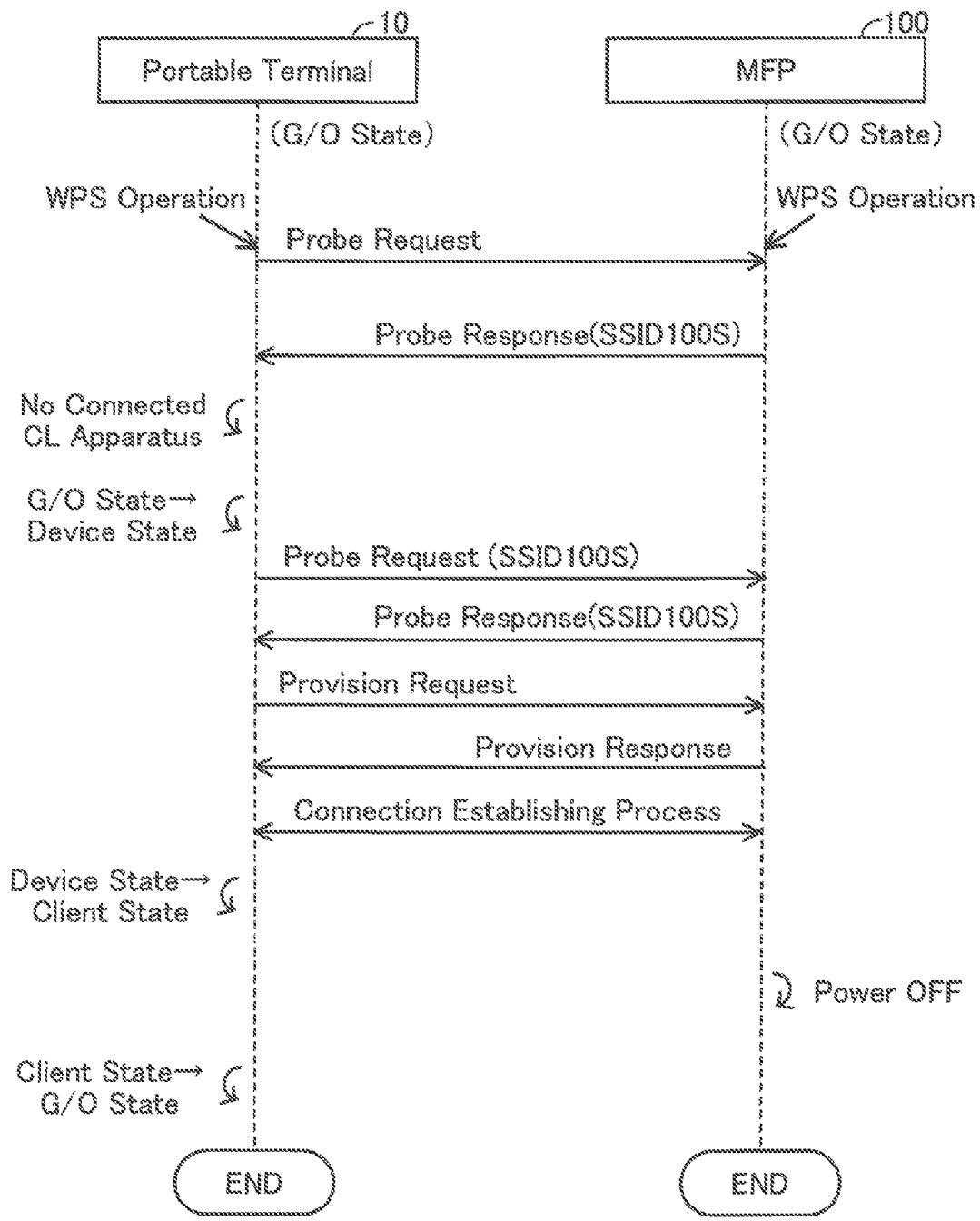
FIG. 3 shows a sequence diagram representing a Case A in which a portable terminal transfers to a device state.
Figure 4:
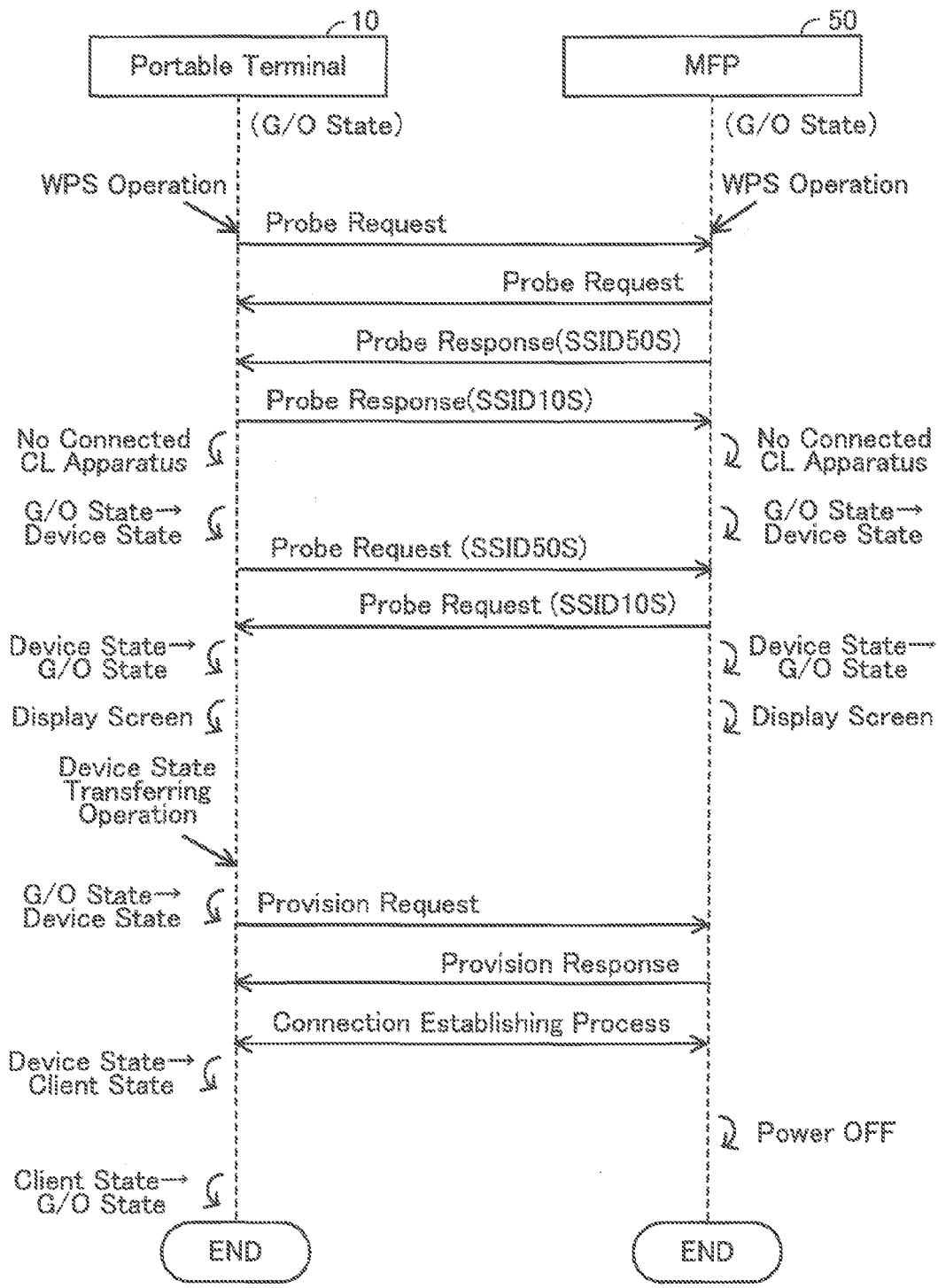
FIG. 4 shows a sequence diagram representing a Case B in which a portable terminal and a multifunction apparatus both transfer to the device state.

Next, the effects of the present embodiment will be explained by referring to FIGS. 3 and 4. FIGS. 3 and 4 show processes executed by the portable terminal 10 and the multifunction apparatus 100 for forming a WFDNW to which the apparatuses 10 and 100 belong. In FIG. 3, the portable terminal 10 is able to execute the connection process of FIG. 2, but the multifunction apparatus 100 is not able to execute the connection process of FIG. 2. In the initial state of FIG. 3, the portable terminal 10 is set to the forced G/O mode and is maintained in the G/O state. The multifunction apparatus 100 is maintained in the G/O state.

(Case A: Case That Portable Terminal 10 Transfers to Device State)

The user executes a WPS operation for both the portable terminal 10 and the multifunction apparatus 100 (S12). As a result, the portable terminal 10 broadcasts a Probe Request signal (S14). Alternatively, because the multifunction apparatus 100 is in the G/O state, and the connection program is not stored in the multifunction apparatus 100, the multifunction apparatus 100 does not receive the Probe Request signal even when the WPS operation is executed.

Upon receiving the Probe Request signal from the portable terminal 10, the multifunction apparatus 100 sends to the portable terminal 10 a Probe Response signal that includes an SSID 100S stored in the multifunction apparatus 100 (that is, identifies the WFDNW to which the multifunction apparatus 100 belongs as the G/O). In accordance with this configuration, the portable terminal 10 can use the Probe Request signal to search for the multifunction apparatus 100. Upon receiving the Probe Response signal (S16), the portable terminal 10 determines whether or not a connected CL apparatus exists (S18). When a connected CL apparatus exists (S18: YES), the processing of S20 and beyond is not executed. As a result, the portable terminal 10 can avoid being transferred from the G/O state to the device state. Consequently, it is possible to avoid a situation in which the connection between the portable terminal 10 and the CL apparatus connected to the portable terminal 10 is disconnected.

When the connected CL apparatus does not exist (S18: NO), the portable terminal 10 transfers the portable terminal 10 from the G/O state to the device state (S20). Then, the portable terminal 10 broadcasts a Probe Request signal that includes the SSID 100S received from the multifunction apparatus 100 (S22).

The multifunction apparatus 100, upon receiving the Probe Request signal, sends to the portable terminal 10 a Probe Response signal because SSID 100S that matches the SSID 100S stored in the multifunction apparatus 100 is included in the Probe Request signal.

When the Probe Response signal is received (S24: YES), the portable terminal 10 sends a Provision Request signal to the multifunction apparatus 100 (S26). The multifunction apparatus 100, upon receiving the Provision Request signal, sends a Provision Response signal in response to the Provision Request signal. In accordance with this configuration, the portable terminal 10 can notify the multifunction apparatus 100 that a WFDNW should be formed by using the Provision Request signal.

The portable terminal 10, upon receiving the Provision Response signal (S28: YES), establishes a connection to the multifunction apparatus 100, and transfers the state of the portable terminal 10 from the device state to the client state (S30). Consequently, a WFDNW to which the multifunction apparatus 100 belongs as the G/O and the portable terminal 10 belongs as the client is formed. In accordance with this configuration, it is possible to form the WFDNW to which the portable terminal 10 and the multifunction apparatus 100 belong, and for the portable terminal 10 and the multifunction apparatus 100 to connect wirelessly even though the portable terminal 10 and the multifunction apparatus 100 are both in the G/O state.

Next, when the connection between the portable terminal 10 and the multifunction apparatus 100 is disconnected in accordance with the power to the multifunction apparatus 100 having been turned OFF (S32: NO), the portable terminal 10 transfers from the client state to the G/O state (S34). In accordance with this configuration, it is possible for the portable terminal 10 to avoid being maintained in the client state despite not being connected to the multifunction apparatus 100.

(Case B: Case That Portable Terminal 10 and Multifunction Apparatus 50 Both Transfer to Device State)

In FIG. 4, the portable terminal 10 and the multifunction apparatus 50 are both able to execute the connection process of FIG. 2. In the initial state of FIG. 3, the portable terminal 10 and the multifunction apparatus 50 are both set to the forced G/O mode.

The user executes the WPS operation for both the portable terminal 10 and the multifunction apparatus 50 (S12). As a result, the portable terminal 10 broadcasts a Probe Request signal (S14). Meanwhile, the multifunction apparatus 50 also broadcasts a Probe Request signal (S14).

The multifunction apparatus 50, upon receiving the Probe Request signal from the portable terminal 10, sends to the portable terminal 10 a Probe Response signal that includes an SSID 50S stored in the multifunction apparatus 50 (that is, identifies the WFDNW to which the multifunction apparatus 50 belongs as the G/O). In the same manner, the portable terminal 10 sends to the multifunction apparatus 50 a Probe Response signal that includes an SSID 10S stored in the memory 24.

The portable terminal 10, upon receiving the Probe Response signal (S16: YES), determines whether or not a connected client state apparatus exists (S18). When a client state apparatus does not exist, the portable terminal 10 transfers the portable terminal 10 from the G/O state to the device state (S20). Then, the portable terminal 10 broadcasts a Probe Request signal including the SSID 50S received from the multifunction apparatus 50 (S22).

In the same manner, upon receiving the Probe Response signal (S16: YES), the multifunction apparatus 50 checks to make sure there is no connected client state apparatus, and transfers the multifunction apparatus 50 from the G/O state to the device state (S20). Then, the multifunction apparatus 50 broadcasts a Probe Request signal including the SSID 10S received from the portable terminal 10 (S22).

Because the portable terminal 10 has been transferred to the device state, the SSID 10S included in the Probe Request signal from the multifunction apparatus 50 is not stored in the portable terminal 10. Therefore, the portable terminal 10 does not send to the multifunction apparatus 50 a response to the Probe Request signal. In the same manner, because the multifunction apparatus 50 has been transferred to the device state, the multifunction apparatus 50 does not send to the portable terminal 10 a response to the Probe Request signal from the portable terminal 10. In accordance with this configuration, the portable terminal 10 is able to determine whether the apparatus that is to be connected is in the G/O state or is not in the G/O state (i.e., the device state) by sending the Probe Request signal. The same processes are performed in the multifunction apparatus 50 as well.

In this case, the portable terminal 10 causes the state of the portable terminal 10 to transfer from the device state to the G/O state (S42). In accordance with this configuration, the portable terminal 10, when it is determined that the multifunction apparatus 50 is not in the G/O state, can transfer the state of the portable terminal 10 to the G/O state. In accordance with this configuration, the portable terminal 10 can avoid being maintained in the device state despite being set in the forced G/O mode. In the same manner, the multifunction apparatus 50 causes the state of the multifunction apparatus 50 to transfer from the device state to the G/O state (S42). The portable terminal 10 causes information urging that either the portable terminal 10 or the multifunction apparatus 50 be transferred to the device state to be displayed on the display unit 14 (S44). In the same manner, the multifunction apparatus 50 displays information urging that either the portable terminal 10 or the multifunction apparatus 50 be transferred to the device state (S44). In accordance with this configuration, the user can learn that either the portable terminal 10 or the multifunction apparatus 50 should be transferred to the device state.

Upon confirming the information displayed on either the portable terminal 10 or the multifunction apparatus 50, the user causes the portable terminal 10 to transfer from the G/O state to the device state by operating the operation unit 14 of the portable terminal 10 (S46: YES). Thereupon, the portable terminal 10 sends a Provision Request signal to the multifunction apparatus 50 (S26). Alternatively, the multifunction apparatus 50 is maintained in the G/O state, and does not send a Provision Request signal. The multifunction apparatus 50, upon receiving the Provision Request signal from the portable terminal 10 (S50: YES), sends a Provision Response signal in response to the Provision Request signal. In accordance with this configuration, the portable terminal 10 can notify the multifunction apparatus 50 that a WFDNW should be formed by using the Provision Request signal.

The portable terminal 10, upon receiving the Provision Response signal (S28: YES), establishes a connection to the multifunction apparatus 50, and transfers the state of the portable terminal 10 from the device state to the client state (S30 and S52). The multifunction apparatus 50 is maintained in the G/O state at this time. Consequently, a WFDNW to which the multifunction apparatus 50 belongs as the G/O and the portable terminal 10 belongs as the client is formed. In accordance with this configuration, it is possible to form the WFDNW to which the portable terminal 10 and the multifunction apparatus 50 belong, and the portable terminal 10 and the multifunction apparatus 50 can be connected despite the portable terminal 10 and the multifunction apparatus 50 are both initially in the G/O state.

For example, when the connection between the portable terminal 10 and the multifunction apparatus 50 is disconnected in accordance with the power to the multifunction apparatus 50 having been turned OFF (S32: NO), the portable terminal 10 transfers from the client state to the G/O state (S34). In accordance with this configuration, the portable terminal 10 is able to avoid being maintained in the client state despite not being connected to the multifunction apparatus 50.

(Correspondence Relationship)

The portable terminal 10 and the multifunction apparatus 50 are both examples of a "communication device", and the portable terminal 10 and the multifunction apparatuses 50 and 100 are each examples of an "external device". The WPS operation is an example of an "instruction for forming a wireless network". The G/O and the client are examples of a "parent station" and a "child station", respectively. The G/O state is an example of a "parent state", and the client state and the device state are both examples of a "non-parent state". The WFDNW formed in S30 of FIG. 2 is an example of a "first wireless network", and the WFDNW to which the portable terminal 10 belongs when YES is determined in S18 of FIG. 2 is an example of a "second wireless network". The Probe Request signal sent in S14 of FIG. 2 is an example of a "searching signal", and the Probe Response signal sent in S16 of FIG. 2 is an example of a "response signal". The Provision Request signal sent in S26 of FIG. 2 is an example of a "request signal". The processing of S26 to S30 of FIG. 2 is an example of a "forming process".

The process of S12 of FIG. 2 is an example of a process executed by an "accepting unit", and the process of S14 is an example of a process executed by a "searching unit". The processes of S20, S34, and S42 are each examples of a process executed by a "transferring unit", and the processes of S26 to S30 are examples of processes executed by a "forming unit". The process of S16 is an example of a process executed by a "receiving unit" and a "first determining unit", the process of S24 is an example of a process executed by a "second determining unit", the process of S32 is an example of a process executed by a "confirming unit", and the process of S44 is an example of a process executed by an "output controlling unit".

(Modification 1)

The "communication device" is not limited to the portable terminal 10 and the multifunction apparatus 50. For example, the "communication device" may be a printer capable of executing only a print function, and a scanner capable of executing only a scan function. Furthermore, for example, the "communication device" may be a device that is used in a non-mobile manner (e.g.: a PC or a server). That is, the "communication device" includes devices that support the WFD scheme.

(Modification 2)

In the examples described above, the processes of FIG. 2 are realized using software (i.e., a program), but at least one of the processes of FIG. 2 may be realized using a logical circuit or other such hardware.

What is claimed is:

1. A communication device comprising:
   a processor; and
   a memory storing computer-readable instructions therein, the computer-readable instructions, when executed by the processor, causing the communication device to execute:
   accepting an instruction for establishing a wireless network to which the communication device and an external device are to belong, each of the communication device and the external device being capable of transferring to one of a parent state of belonging to the wireless network as a parent station and a non-parent state being different from the parent state;

searching for the external device in a case where the instruction is accepted;

causing a state of the communication device to transfer from the parent state to the non-parent state in a case where the communication device is in the parent state and the searched external device is in the parent state; and executing a forming process for forming a first wireless network to which the communication device is to belong as a child station and the external device is to belong as the parent station after the state of the communication device has transferred to the non-parent state.

2. The communication device as in claim 1, wherein
the searching includes searching for the external device by sending a searching signal, and
the computer-readable instructions, when executed by the processor, cause the communication device to further execute:
  receiving a response signal as a response to the searching signal; and
  determining whether the external device is in the parent state based on the response signal.

3. The communication device as in claim 2, wherein
the determining determines that the external device is in the parent state in a case where the response signal includes wireless setting which specifies a wireless network, and
the determining determines that the external device is in the non-parent state in a case where the response signal does not include the wireless setting.

4. The communication device as in claim 1, wherein
the forming process includes a process of sending a request signal for forming the first wireless network to the external device after the state of the communication device has transferred to the non-parent state.

5. The communication device as in claim 1, wherein
the computer-readable instructions, when executed by the processor, cause the communication device to further execute:
  determining whether the external device is in the parent state after the state of the communication device has transferred to the non-parent state by reason that a state of the external device has not transferred from the parent state to the non-parent state.

6. The communication device as in claim 5, wherein
the computer-readable instructions, when executed by the processor, cause the communication device to further execute:
  causing the state of the communication device to transfer from the non-parent state to the parent state in a case where it is determined that the external device is not in the parent state by the reason that the state of the external device has transferred from the parent state to the non-parent state.

7. The communication device as in claim 6, wherein
the computer-readable instructions, when executed by the processor, cause the communication device to further execute:
  causing an output unit to output transfer information for causing the state of one of the communication device and the external device to transfer to the non-parent state in a case where the communication device is transferred from the non-parent state to the parent state.

8. The communication device as in claim 1, wherein
the computer-readable instructions, when executed by the processor, cause the communication device not to cause the state of the communication device to transfer from the parent state to the non-parent state in a case where there is an apparatus belonging as a child station to a second wireless network, to which the communication device belongs as the parent station.

9. The communication device as in claim 1, wherein
the computer-readable instructions, when executed by the processor, cause the communication device to further execute:
  confirming whether the external device belongs to the first wireless network after the first wireless network has been formed, and
  causing the state of the communication device to transfer from the non-parent state to the parent state in a case where it is confirmed that the external device does not belong to the first wireless network.

10. A non-transitory computer-readable recording medium storing computer-readable instructions for an information processing device,
the computer-readable instructions, when executed by a processor of the information processing device, causing the information processing device to perform:
accepting an instruction for establishing a wireless network to which a communication device and an external device are to belong, each of the communication device and the external device being capable of transferring to one of a parent state of belonging to the wireless network as a parent station and a non-parent state being different from the parent state;
searching for the external device in a case where the instruction is accepted;
causing a state of the communication device to transfer from the parent state to the non-parent state in a case where the communication device is in the parent state and the searched external device is in the parent state; and
executing a forming process for forming a first wireless network to which the communication device is to belong as a child station and the external device is to belong as the parent station after the state of the communication device has transferred to the non-parent state.

* * * * *